(12) United States Patent  
Fan et al.

(10) Patent No.: US 8,921,715 B2
(45) Date of Patent: Dec. 30, 2014

(54) CABLE BUSHING ASSEMBLY

(71) Applicant: General Electric Company, Schenectady, NY (US)

(72) Inventors: Kai Fan, Shanghai (CN); Liangjun Qiu, Shanghai (CN); Ting Xu, Shanghai (CN)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 13/709,129

(22) Filed: Dec. 10, 2012

(65) Prior Publication Data

US 2014/0158422 A1    Jun. 12, 2014

(51) Int. Cl.
*H02G 3/22* (2006.01)
(52) U.S. Cl.
CPC .................................... *H02G 3/22* (2013.01)
USPC ............................ 174/650; 137/797; 138/177

(58) Field of Classification Search
USPC .................. 174/650; 137/797, 798; 138/177; 248/56
See application file for complete search history.

(56) References Cited

U.S. PATENT DOCUMENTS 7,772,506 B2 *    8/2010    Suter et al. .................... 174/650

* cited by examiner

*Primary Examiner* — Dhirubhai R Patel
(74) *Attorney, Agent, or Firm* — Cooper Legal Group, LLC

(57) ABSTRACT

A cable bushing assembly and a method of sealing a cable penetration through a housing are provided. The bushing assembly includes an interior shell, a central cavity and at least one aperture between a first face and a second face. At least one cable passes through the bushing assembly. The bushing assembly also includes an exterior shell at least partially circumscribing the interior shell. A clasp is located between the interior shell and the exterior shell to prevent separation of the exterior shell from the interior shell. Packing material seals the at least one cable within the interior shell. A method of sealing a cable penetration includes providing a housing with an opening, inserting a bushing assembly into the opening, and securing the cable bushing.

20 Claims, 5 Drawing Sheets

CABLE BUSHING ASSEMBLY

BACKGROUND OF THE INVENTION

1. Field of the Invention

The invention relates to threaded cable connectors, and specifically relates to a threaded cable connector having an exterior shell that is rotatable with respect to an interior shell.

2. Discussion of Prior Art

Cable connectors can be used to provide a barrier between an interior and an exterior of a housing at a location of a cable extending through a wall of the housing. Such cable connectors can help protect the cable from abrasion damage with the housing wall and prevent some elements from passing through the housing. Cable connectors such as cable bushing assemblies can be used in any number of applications, including a flow meter.

Many of these cable connectors are designed for use with wires or cables having relatively low data transmission capability. Furthermore, many of the cable connectors have complicated manufacturing methods. Still further, many of the cable connectors are not rated for use in certain locations. As such, there are benefits for continual improvements in cable bushing technologies so as to address these and other issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a cable bushing assembly including an interior shell. The interior shell defines a central cavity and at least one aperture between a first face and a second face. The at least one aperture is configured to permit at least one cable to pass through the interior shell from a space exterior to the shell to the central cavity. The cable bushing assembly also includes an exterior shell at least partially circumscribing the interior shell. The cable bushing assembly further includes a clasp located between the interior shell and the exterior shell to prevent separation of the exterior shell from the interior shell. The cable bushing assembly still further includes a packing material located within the central cavity to seal the at least one cable within the interior shell.

Another aspect of the invention provides a cable bushing assembly including an interior shell. The interior shell defines a central cavity and at least one aperture between a first face and a second face. The at least one aperture is configured to permit at least one cable to pass through the interior shell from a space exterior to the shell to the central cavity. The interior shell further includes a plate within the central cavity. The plate includes at least one aperture configured to permit at least one cable to pass through the plate. The cable bushing assembly also includes an exterior shell at least partially circumscribing the interior shell. The cable bushing assembly further includes a clasp located between the interior shell and the exterior shell to prevent separation of the exterior shell from the interior shell. The cable bushing assembly still further includes a packing material. The packing material is located within the central cavity to seal the at least one cable within the interior shell.

Another aspect of the invention provides a method of sealing a cable penetration through a housing. The method includes providing a housing with an opening extending through a wall of the housing. The method further includes inserting a cable bushing assembly into the opening. The bushing assembly includes an interior shell. The interior shell defines a central cavity and at least one aperture between a first face and a second face. The at least one aperture is configured to permit at least one cable to pass through the interior shell from a space exterior to the shell to the central cavity. The cable bushing assembly also includes an exterior shell at least partially circumscribing the interior shell. The cable bushing assembly further includes a clasp located between the interior shell and the exterior shell to prevent separation of the exterior shell from the interior shell. The cable bushing assembly still further includes a packing material located within the central cavity to seal the at least one cable within the interior shell.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
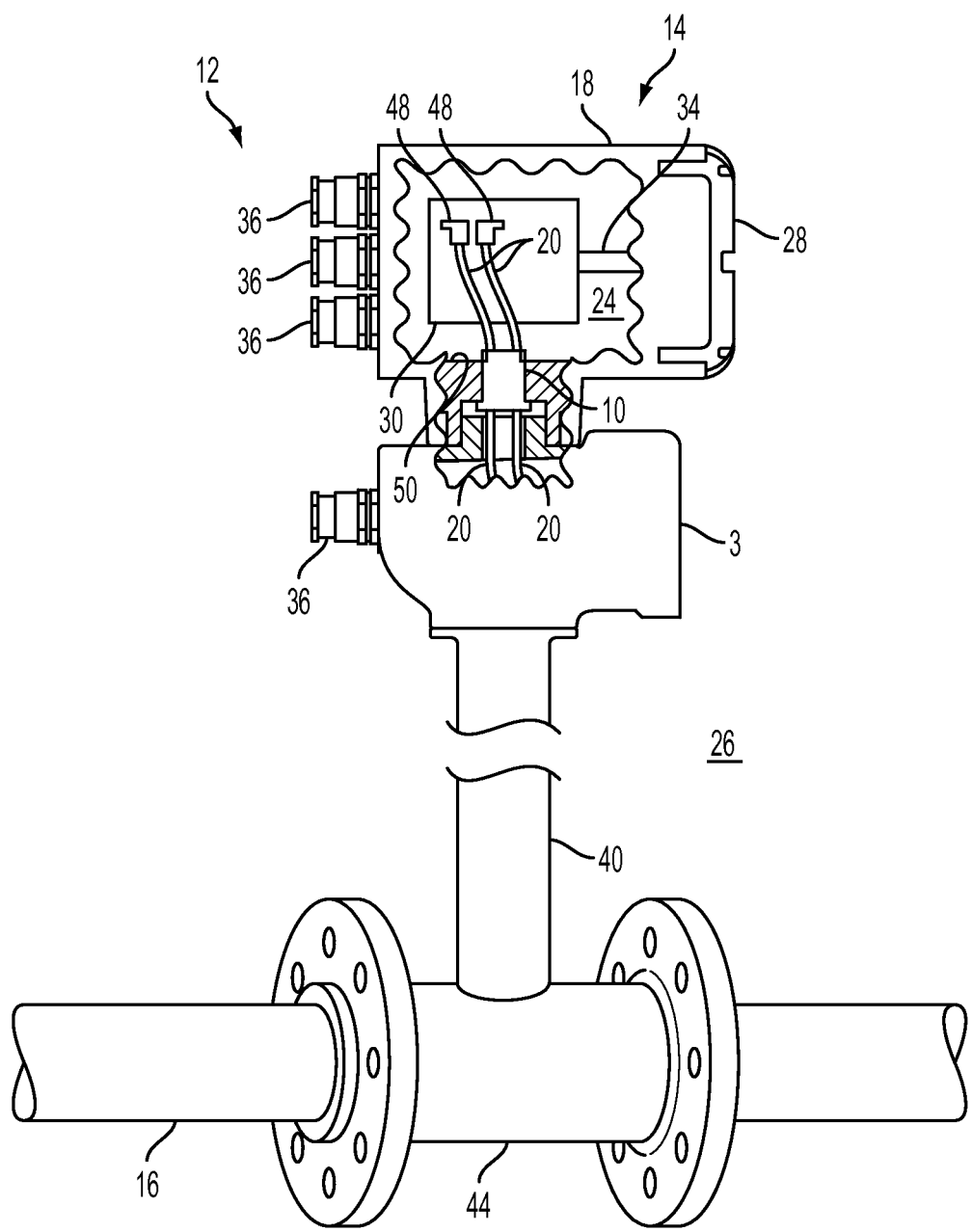
FIG. 1 is a schematized illustration of an example cable bushing assembly located in an example arrangement of metering equipment in accordance with at least one aspect of the present invention.

Example embodiments that incorporate one or more aspects of the invention are described below and illustrated in the drawings. These illustrated examples are not intended to be a limitation on the invention. For example, one or more aspects of the invention can be utilized in other embodiments and even with other types of devices. Moreover, certain terminology is used herein for convenience only and is not to be taken as a limitation on the invention. Still further, in the drawings, the same reference numerals are employed for designating the same elements.

An example embodiment of a cable bushing assembly 10 is schematically shown within FIG. 1. The cable bushing assembly 10 is shown in one example arrangement 12 with associated equipment in a field application. It is to be appreciated that FIG. 1 merely shows one example of possible structures/configurations/etc. and that other examples are contemplated within the scope of the present invention. FIG. 1 shows an arrangement 12 including a flow meter 14 used in conjunction with a section of process piping 16 containing a flow of process fluid (not shown). The flow meter 14 includes a housing 18 through which cables 20 pass from an interior location 24 to an exterior location 26. As used herein, the term cables can include various types of wiring, conduit, piping, tubing, electrical instrumentation, or any other type of equipment that may pass from an interior location of a housing to an exterior location of a housing. While FIG. 1 shows one cable bushing assembly 10 used in conjunction with a flow meter 14, one example flow meter 14 can include a plurality of cable bushing assemblies 10.

It should be noted that although the cable bushing assembly 10 and associated methods are described with respect to the example arrangement 12 including a flow meter 14 and a housing 18, one of ordinary skill in the art should understand that the present invention is not limited to being used only with a housing 18 associated with a flow meter 14. Rather, the present invention may be used with any type of housing where cables pass from an interior location to an exterior location, such as junction boxes, bulkheads, various enclosures, etc. Furthermore, the cable bushing assembly 10 is described herein only with respect to use with the housing of a flow meter, however, it is to be understood that the cable bushing assembly 10 can be used with any type of housing used to enclose various types of sensors, electronics, etc.

In one specific example of a cable bushing assembly 10 used in conjunction with a flow meter 14, the housing 18 can include a display 28 (facing to the right in FIG. 1). The display 28 can be used to visually display data, system conditions, input options, etc. A keypad can be optionally provided on the display 28 for user input, menu selections, etc. for the flow meter 14. The display 28 can be in electrical communication (e.g., electrically connected) with a printed circuit board (PCB) 30 via circuit 34. The PCB 30 can include hardware and software to operate the flow meter 14. The housing 18 can also include cable glands 36 (e.g., cable connectors or fittings) designed to attach and secure a portion of a cable to the housing 18. In some examples, the cable glands 36 can enable various wires or cables (not shown) to enter the housing, such as an electrical power cord supplying electrical power to the flow meter 14.

The arrangement 12 can include other associated equipment operating in conjunction with the cable bushing assembly 10 and the flow meter 14. The associated equipment can include an enclosure 38 which can be attached directly to the housing 18. One or more cable glands 36 can also be mounted to the enclosure 38. Electronic equipment such as a transducer circuit (not shown) can be housed within the enclosure. Alternatively, the enclosure can remain empty, or simply not be included with the arrangement 12 of associated equipment. A support 40 can also be provided within the arrangement 12 to locate the flow meter 14 at a suitable location. Within the shown example, the support 40 of the arrangement 12 can be located between a flanged pipe fitting 44 and the enclosure 38, which can be mounted directly to the support 40. In the event that the enclosure 38 is not included in the arrangement 12, the support 40 can be located between the housing 18 and the flanged pipe fitting 44. For simplicity, the flanged pipe fitting 44 as shown in FIG. 1 is schematic and can include additional features such as flange bolts, additional flanges, etc.

Additional associated equipment of the arrangement 12 may include a stem (not shown) extending from the flow meter 14, through or along the support 40, and into the flanged pipe fitting 44. The stem can locate flow meter equipment (not shown), such as a sensor, at a suitable location within a fluid flow inside the flanged pipe fitting 44 to properly sense at least one condition of the fluid flow within the process piping 16. The flow meter 14 can be designed to sense a condition in a fluid flow that may include gas, liquid, steam including volumetric flow rate or mass flow rate. The stem can also include an electrical connection (not shown) between the sensor and the PCB 30 within the housing 18. The electrical connection can include multiple wires or conductors enabling two-way signal transmission between the sensor and the PCB 30. The wires can supply a power signal to the sensor from the PCB 30 and also transmit a signal proportional to a fluid flow rate within the process piping 16 from the sensor to the PCB 30. It is to be appreciated that the sensor can be any type of flow meter equipment including, but not limited to, vortex shedding, vane style, laminar flow element, coriolis mass, magnetic, target displacement, ultrasonic, etc. Additionally, the flow meter equipment can sense other conditions of the fluid flow, such as temperature and pressure, among other variables.

The sensor senses a condition of the fluid flow and generates a signal that is proportional to the fluid flow rate within the process piping 16. The generated signal (often an analog signal) is transmitted via the wires or conductors to the PCB 30 within the housing 18. The PCB 30 receives the signal provided from the sensor and can process the signal in any number of ways using an electrical circuit and signal processing hardware included on the PCB 30. In one example, the PCB 30 can include an analog to digital converter, a processor, and an output circuit. In one example, the analog to digital converter within the PCB 30 can convert the analog signal to a digital signal. PCB 30 can include software that interprets the digital signal for a particular type of flow meter sensor (e.g., vortex shedder, turbine, ultrasonic, etc.) and carry-out any necessary corrections to the digital signal.

While not shown due to the schematic nature of the illustration, the PCB 30 can include multiple printed circuit boards. Furthermore, it is to be appreciated that one PCB 30 can also include multiple electrical circuits. It should be noted that FIG. 1 shows a simplified version of the flow meter 14 and the PCB 30, and these components may include various features, and such features need not be part of the present invention. In another example, the corrected digital signal can then be placed in electronic memory (not shown) for retrieval at a later time or the signal can be moved to an output circuit for retrieval through a suitable output.

Alternatively, the signal can be transmitted to other computing systems, or other locations via other outputs, such as an electrical connector or cable 20. In another example, the flow meter 14 can be provided with a remote electronics option, wherein all or a number of signal processing hardware components are located a distance away from the flow meter 14. In each of these two cases, the cable 20 can be used to transmit a signal to a location a distance away from the flow meter for data distribution, signal processing, or the like. FIG. 1 shows the cables 20 connected to the PCB 30 using connectors 48. In one example, the connectors 48 are micro coaxial connectors (MCX connectors). The MCX connectors use a snap-on interface with corresponding structure located on the PCB 30. The cables 20 are shown passing through the cable bushing assembly 10 which is located in a wall 50 of the housing 18. The cables 20 then pass into the enclosure 38 where they may be connected to additional signal processing hardware. In another example, the enclosure 38 may not be included in the arrangement 12 of associated equipment, and the cables 20 can be routed to another location.

Each cable 20 can each be a single, uninterrupted coaxial cable from its connector 48 on the PCB 30, through the cable bushing assembly 10, to the opposite end of the cable 20. In one example, each cable 20 can be 15.25 meters (50 feet) in length. Selection and use of coaxial cable and MCX connectors for each cable 20 enables a relatively large signal transmission capacity. In one example, a single cable 20 including commercially available coaxial cable and MCX connectors on both ends can provide broadband capability of 6 GHz or more.

Figure 2:
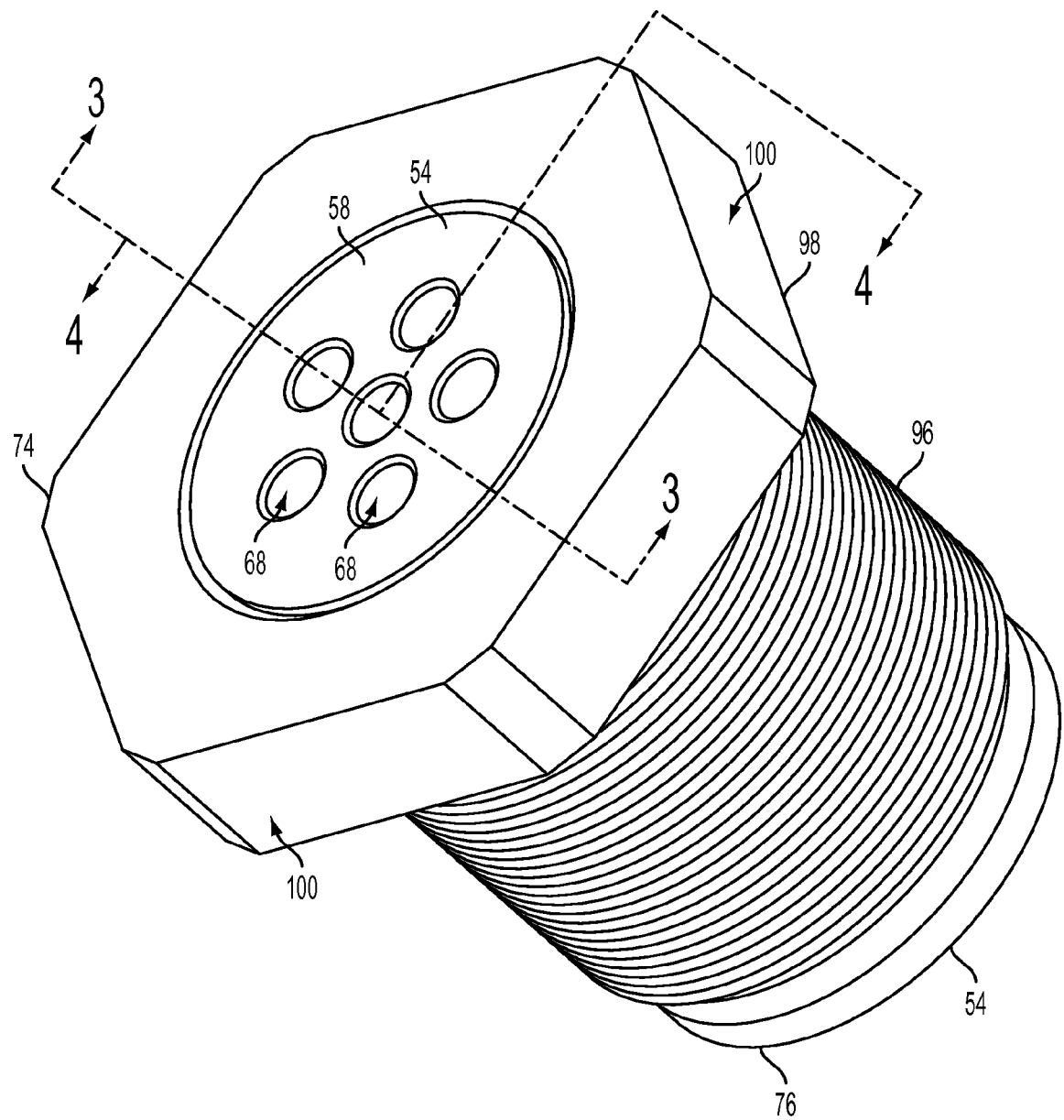
FIG. 2 is a perspective view of the cable bushing assembly of FIG. 1 with the cables removed for clarity.
Figure 3:
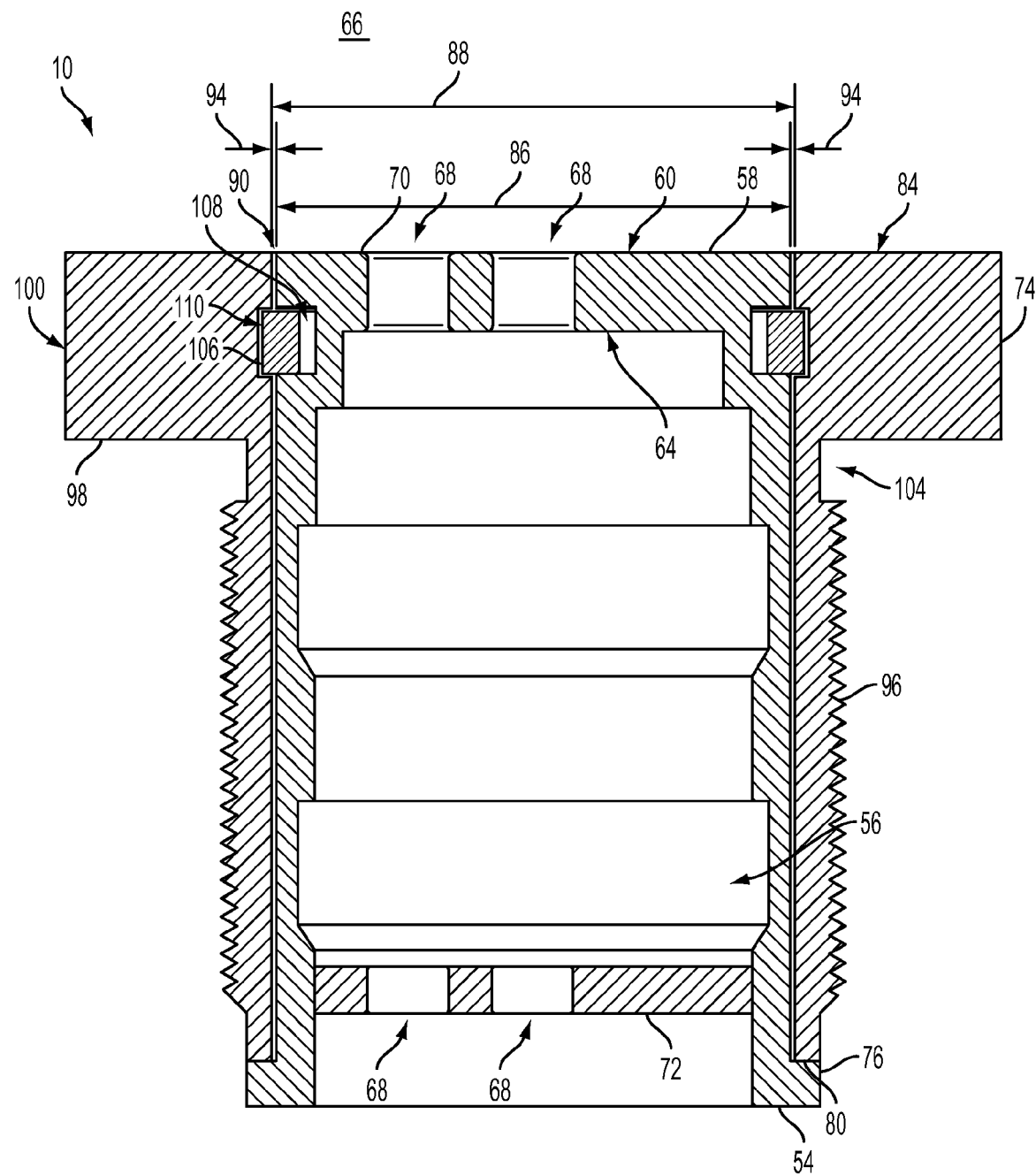
FIG. 3 is a cross-sectional view of the cable busing assembly taken along lines 3-3 of FIG. 2.

Turning to FIG. 2, a perspective view of an example cable bushing assembly 10 is shown. For simplicity, the cable bushing assembly 10 is shown with the cables 20 removed from the assembly. The cable bushing assembly 10 includes an interior shell 54 which can be generally cylindrical in shape. The interior shell 54 can be constructed of any suitable material. In one example, the interior shell is constructed of brass. Turning to FIG. 3, the interior shell 54 defines a central cavity 56. In one example, the central cavity 56 can be generally cylindrical in shape, concentric with the outer diameter of the interior shell 54, although other shapes and orientations are contemplated.

The interior shell 54 includes a wall 58 having a first face 60 and a second face 64. The wall 58 can be generally cylindrical in shape having a length that is relatively short in comparison to its diameter. In the shown example, the first face 60 is located on the outside of the interior shell 54 and the second face 64 is located on the inside of the interior shell 54. The wall 58 can define a barrier between a space 66 exterior to the interior shell 54 and the central cavity 56. The wall 58 can be an integral part of the interior shell 54 and can be constructed of the same material as the interior shell 54, such as brass.

The wall 58 defines at least one aperture 68 extending through the wall 58 between the first face 60 and the second face 64. Each aperture 68 is configured to enable at least one cable 20 to pass through the wall 58 of the interior shell 54 from the space 66 exterior to the interior shell 54 and pass into the central cavity 56. Each aperture 68 can include a fillet 70 or a chamfer at the first face 60 and/or the second face 64 to help reduce any forces between the cable 20 and the wall 58 that may lead to abrasions or cuts in the surface of the cable 20. While the cross-sectional view in FIG. 3 shows two apertures 68, it is to be appreciated that any number of apertures may be included in the wall 58 of the interior shell 54. For example, FIG. 2 illustrates six apertures 68 included in the wall 58. Center-to-center distances between the apertures can be selected based on several criteria including ease of assembly of the cables 20 within the interior shell 54, minimizing interference between cables 20, etc.

Returning to FIG. 3, the interior shell 54 can also include a rear wall 72 which is one example of a plate. The rear wall 72 can include apertures 68 identical to those in the wall 58, and aligned so that the axes of the wall 58 apertures 68 are collinear with corresponding rear wall 72 apertures 68. While not necessary, the rear wall 72 apertures 68 enable an operator to maintain the cables 20 in an orderly arrangement, such as parallel to each other as they pass through the central cavity 56. The rear wall 72 can be integral to the interior shell 54, but is more likely attached to the interior shell 54 using a suitable attachment method. The rear wall 72 can be constructed of the same material as the interior shell 54, such as brass.

Aperture diameters in both the wall 58 and the rear wall 72 can be preselected to be substantially similar to the outside diameter of the cable 20 that is to be inserted through the aperture 68. In one example, the cable 20 is a coaxial cable, chosen from a number of commercially available coaxial cables, and the aperture 68 diameter is selected to create a gap between the cable 20 and the aperture inside diameter of a few thousandths of an inch. Additionally, if several different types of coaxial cables are chosen for use with one cable bushing assembly 10, several different aperture diameters can be included, each selected for use with the particular coaxial cable chosen to pass through the individual aperture 68.

The cable bushing assembly also includes an exterior shell 74 at least partially circumscribing the interior shell 54. As shown in FIG. 3, the exterior shell 74 can circumscribe the interior shell 54 over substantially the entire length of the interior shell 54. In one example, the interior shell 54 can include an annular ridge 76 around the circumference of the interior shell 54 at the end of the interior shell 54 opposite the first face 60. The length of the exterior shell 74 can be selected such that a first surface 80 of the exterior shell 74 contacts the annular ridge 76 placing a second surface 84 substantially within the same plane as first face 60 of the interior shell 54. The exterior shell 74 can be constructed of any suitable material. In one example, the exterior shell 74 is constructed of brass.

The length of the inside diameter 86 of the exterior shell 74 can be approximately equal but slightly longer than the length of the outside diameter 88 of the interior shell 54. This difference in lengths between the two diameters 86, 88 creates an annular space 90 between the interior shell 54 and the exterior shell 74. In one example, the annular space 90 can have a width dimension 94 of less than about 0.08 mm (0.003 inches). It is to be appreciated that after the exterior shell 74 is located concentrically to the interior shell 54, the annular space 90 is configured to enable the exterior shell 74 to rotate relative to the interior shell 54. This feature is beneficial in that the cable bushing assembly 10 can be fully assembled including a condition wherein the cables 20 are fixed to the interior shell 54 to form a seal. Then, the cables 20 can be connected to the PCB 30 within the housing 18 and the exterior shell 74 can be threaded into corresponding threads formed in the housing 18 to form a strong, reliable threaded connection while not turning or twisting the cables 20. Elimination and/or reduction of cable 20 twisting helps ensure the connectors 48 remain firmly connected to the PCB 30 while the cable bushing assembly 10 is being threadingly engaged to the housing 18. Twisting cables 20 can possibly cause damage to the cables 20, damage to the PCB 30, and other undesirable effects.

The exterior shell 74 includes a threaded portion 96 around the circumference of the exterior shell 74. Threaded portion 96 is configured to be threadingly engaged with a corresponding thread pattern in the housing 18 (best seen in FIG. 1) of the flow meter 14. Any suitable thread pitch can be chosen for the threaded portion 96. In one example, the cable bushing assembly 10 becomes fully engaged with the housing 18 after about 20 to 30 complete rotations of the exterior shell 74. The exterior shell 74 can also include a flange 98 on the end of the exterior shell 74 including the second surface 84. Surfaces 100 (best seen in FIG. 2) can be formed into the flange 98 to correspond with a rotational tool (not shown) to aid in threading the cable bushing assembly 10 into the housing 18. In one example, the surfaces 100 can form a hexagonal flange 98 enabling interaction with a standard open-ended wrench or a socket. Other flange 98 shapes and rotational tools are also contemplated. The exterior shell can also include an optional relief 104 to lessen the possibility of the threaded portion 96 binding with the housing 18 as the cable bushing assembly 10 is fully threaded into the housing 18.

The cable bushing assembly 10 also includes a clasp 106 located between the interior shell 54 and the exterior shell 74. In one example, the clasp 106 can be generally annular and interact with a groove 108 in the interior shell 54 and a corresponding groove 110 in the exterior shell 74. In a more specific example, the clasp 106 is configured like a split ring, much like an automotive piston ring. In this example, a force can be applied to the clasp 106 to increase its diameter to enable the clasp 106 to be slid over the interior shell 54 from the end including the first face 60. As the clasp 106 enters the groove 108, it will have a tendency to return to a smaller diameter while no external forces are applied to the clasp 106.

During the assembly process, a force can be applied to the clasp 106 in order to reduce its diameter so that the exterior shell 74 can be slidingly engaged with the interior shell 54. When the exterior shell 74 attains a position placing the groove 108 and the corresponding groove 110 adjacent each other, the clasp 106 expands again to fill portions of both the groove 108 and the corresponding groove 110. Location of the clasp 106 within portions of both the groove 108 and the corresponding groove 110 prevents separation of the exterior shell 74 from the interior shell 54 by providing a physical interference between the two shells 54, 74. Additionally, the described location of the clasp 106 also helps locate the exterior shell 74 with respect to the interior shell 54 in both an axial direction and a radial direction.

Figure 4:
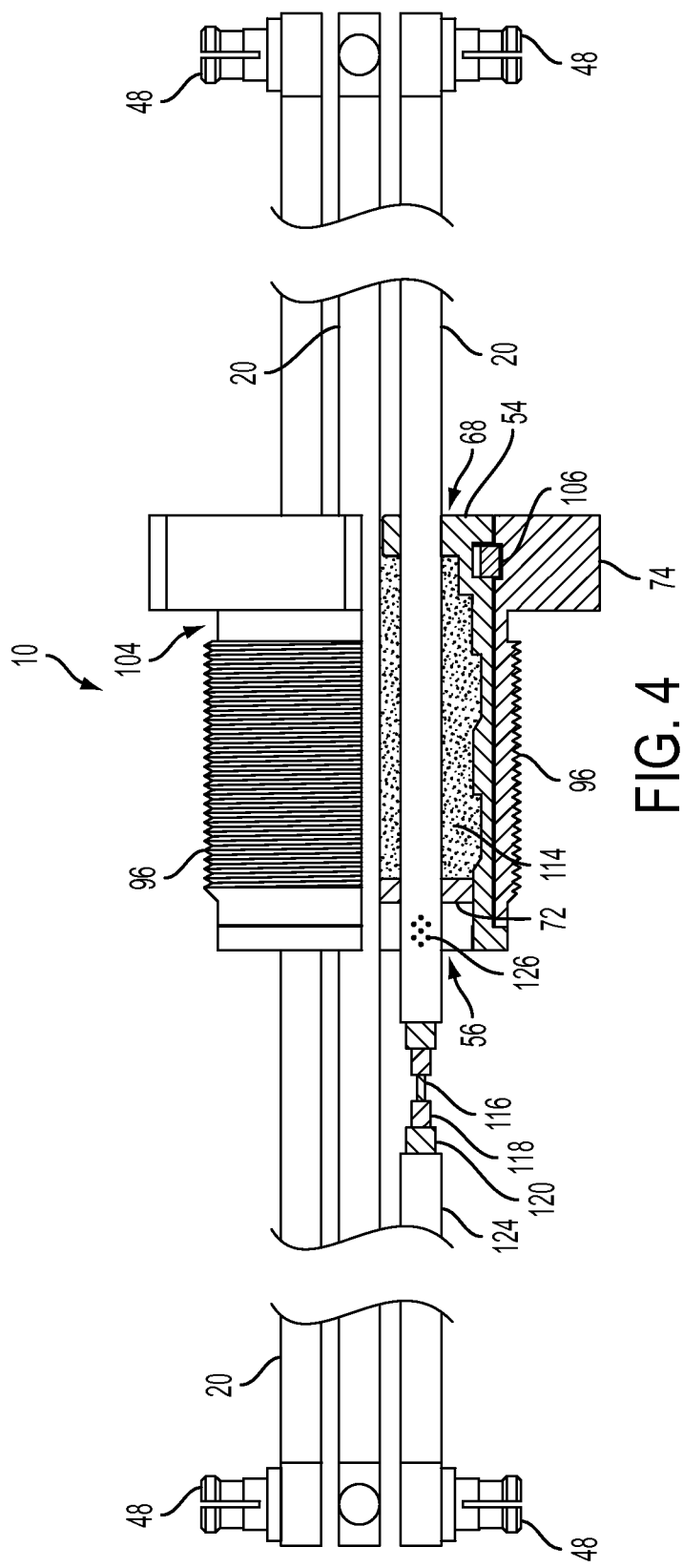
FIG. 4 is a partial cross-sectional view of the cable bushing assembly taken along lines 4-4 of FIG. 2, and with the cables and other associated structure in place.

Turning to the partial cross-section of FIG. 4, the cables 20 are placed through the apertures 68, to run through the interior shell 54 and have lengths extending away from the interior shell 54 on both sides of the interior shell 54. The shown example of FIG. 4 does not include the optional rear wall 72 as is shown in FIG. 3. Connectors 48 such as the MCX connectors described above can be attached to each end of each cable 20 to enable electrical connections between the cable 20 and signal processing hardware, such as PCB 30 (best seen in FIG. 1). The cable bushing assembly 10 also includes a packing material 114 filling at least a portion of the central cavity 56. The packing material 114 can also be referred to as a potting material or glue. The packing material 114 can be introduced into the central cavity 56 after the cables 20 have been located within the central cavity 56. In one example, the packing material 114 is injected into the central cavity 56 as a liquid, enabling the packing material 114 to fill the volume within the central cavity 56 and then solidifying to form a seal around the cables 20, effectively sealing the at least one cable 20 within the interior shell 54. This seal can create a sealed interior location 24 such that undesired materials from the exterior location 26 including, but not limited to, gas, moisture, condensation, etc. are limited and/or prevented from entering the interior location 24 of the housing 18 (best seen in FIG. 1).

It is to be appreciated that the surface of the central cavity 56 can be prepared prior to applying the packing material 114. In one example, the interior surface of the central cavity 56 can be prepared by creating a relatively rough profile by working the surface with an abrasive material such as emory paper, or the like. The relatively rough profile can give the packing material 114 an increased bond strength with the interior shell 54.

In one example, the packing material 114 is an epoxy. The epoxy can be a commercially available epoxy that limits or eliminates relative movement between the cables 20 and the interior shell 54. It is to be appreciated that the cables 20 can be prepared prior to the application of the epoxy in order to foster the creation of a better seal between the cables 20 and the interior shell 54. In one example, the cable 20 is a coaxial cable including an inner conductor 116 which can be a flexible solid or a stranded copper wire as shown in a partial cut-away of the cable 20 in FIG. 4. A layer of plastic 118, the conductive layer 120, and an outer jacket 124 can surround the inner conductor 116.

Often, the packing material 114 (e.g. epoxy), includes a two part epoxy resin, and the epoxy can include a partially polymerized resin. In some examples, the molecules (e.g., monomers) which form the epoxy include a first part of a low molecular weight epoxy and a second part of a molecule containing a number of benzene groups with two reactive hydroxyl groups. The second part can be called the hardener and can include an amine. In one example, the amine is a low molecular weight and only a relatively small amount of the amine is required to cure the resin. In another example, the amine includes a longer molecular chain permitting flexibility in the resin and a relatively larger amount of the amine is required to cure the resin. Before curing, the resin has a relatively low surface tension and provides relatively high adhesion forces.

The resultant epoxy can be a polymer often termed polyether including amine and benzene groups. The benzene groups and the polyether linkages result in a polymer with properties that are sometimes found to be beneficial. These beneficial properties can include, but are not limited to, adhesion, chemical inertness, temperature resistance, high strength, and electrical resistance. As best seen in FIG. 3, the surface of the central cavity 56 can be irregular, including varying widths or diameters along the axial length of the central cavity 56. This can be beneficial in at least two ways including providing more surface area with which the packing material 114 can bond, thereby improving the strength of the seal created by the packing material 114 within the central cavity 56. Additionally, the varying diameters can create physical impediments that help prevent the packing material 114 from being pulled out of the central cavity, thereby increasing the pull strength of the cable bushing assembly 10.

In another example, the cable bushing assembly 10 can be configured to provide an intrinsically safe connection between the interior location 24 and the exterior location 26 (best seen in FIG. 1) relative to a housing 18 wherein the housing 18 is penetrated by cables 20. The set of cable bushing assembly 10 is configured to be intrinsically safe by ensuring that electrical and/or thermal energy exposed to the atmosphere at the cable bushing assembly 10 are at levels insufficient to ignite an explosive atmosphere under normal or abnormal conditions. It is to be appreciated that connectors such as cable glands and the described cable bushing assembly 10 configured to be intrinsically safe can be placed at all of the penetrations of the housing 18. In one example, the described width dimension 94 of the annular space 90 can be less than about 0.08 mm (0.003 inches) (best seen in FIG. 3). This particular width has been deemed by at least one accreditation agency as being intrinsically safe for this type of fitting. Thus, the cable bushing assembly 10 can be suitable for use in areas subjected to hazardous concentrations of flammable gas, vapor, mist, or combustible dust in suspension.

It is to be appreciated that certain performance characteristics can be attained by the described cable bushing assembly 10. In one example, after the packing material 114 is completely solidified, the cable bushing assembly 10 can have an insulating resistance of about at least 1,000 MΩ at a test voltage of 500 volts direct current (DC). Additionally, the cable bushing assembly 10 can exhibit a voltage tolerance characterized by no material breakdown during an application of 500 volt alternating current (AC) at a current of 5 mA for a period of one minute. Furthermore, the cable bushing assembly 10 should be able to withstand an applied force of at least about 4 MPa for one minute on the open ended side of the central cavity while exhibiting no detachment between the packing material 114 and the interior shell 54.

Figure 5:
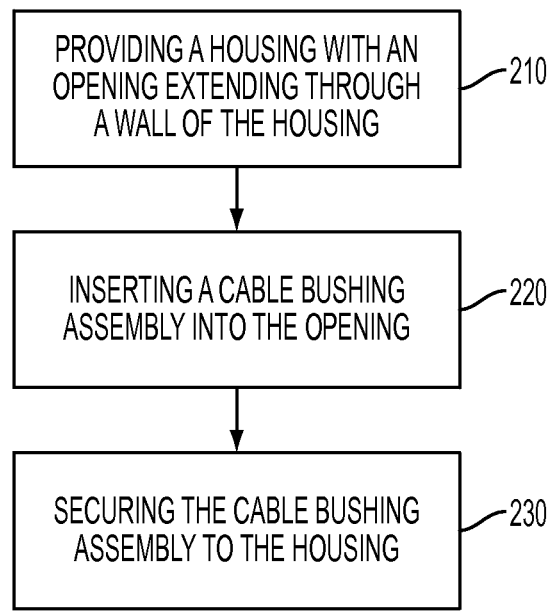
FIG. 5 is a top level flow diagram of an example method of sealing a cable penetration through a housing.

An example method sealing a cable penetration through a housing is generally described in FIG. 5. The method can be performed in connection with the example cable bushing assembly 10 as shown in FIGS. 1-4. The method includes the step 210 of providing a housing 18 with an opening extending through a wall of the housing 18. In one example, the housing 18 houses portions of a flow meter 14, the housing 18 including cables 20 passing from an interior location 24 to an exterior location 26 with respect to the housing 18.

The method further includes the step 220 of inserting a cable bushing assembly 10 into the opening, the cable bushing assembly 10 including an interior shell 54. The interior shell 54 defines a central cavity 56 and at least one aperture 68 between a first face 60 and a second face 64. The at least one aperture 68 is configured to enable at least one cable 68 to pass through the interior shell 54 from a space exterior 66 to the shell to the central cavity 56. An exterior shell 74 at least partially circumscribes the interior shell 54, wherein the exterior shell 74 includes a threaded portion 96 and a clasp 106. The clasp 106 is located between the interior shell 54 and the exterior shell 74 to prevent separation of the exterior shell 74 from the interior shell 54. A packing material 114 is located within the central cavity 56 to seal the at least one cable 68 within the interior shell 54.

The method further includes the step 230 of securing the cable bushing assembly 10 to the housing 18. In one example, this step includes threading the exterior shell 74 into corresponding threads formed in the housing 18. The annular space 90 is configured to enable the exterior shell 74 to rotate relative to the interior shell 54. This feature is beneficial in that the cable bushing assembly 10 can be fully assembled including a condition wherein the cables 20 are fixed to the interior shell 54 to form a seal. Then, the cables 20 can be connected to the PCB 30 within the housing 18 and the exterior shell 74 can be threaded into corresponding threads formed in the housing 18 to form a strong, reliable threaded connection while not turning or twisting the cables 20.

The cable bushing assembly and methods of sealing a cable penetration through a housing described herein provide a relatively low cost alternative for a cable connector designed specifically for coaxial cables. This apparatus is also relatively easily constructed. In one example, most components of the cable bushing assembly can be created with the use of a limited number of operations on a CNC machine including cutting, drilling, and threading brass bar stock. Additionally, the cable bushing assembly and methods described can greatly increase the capacity of data transmission possibilities through cable connectors, as coaxial cable can have much greater data transmission capability than more frequently used wires used with other connectors. Furthermore, the described cable bushing assembly and methods provide much a sealing cable connector that can be threaded into a housing while not twisting the cables sealed within the cable bushing assembly. Also, the cable bushing assembly and methods enable the cable bushing to provide a cable connector which is rated for use in hazardous locations.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A cable bushing assembly including:
   an interior shell defining a central cavity and having a barrier wall between the central cavity and an exterior of the interior shell, with the barrier wall having at least one aperture between a first face and a second face of the barrier wall, the at least one aperture configured to permit at least one cable to pass through the interior shell from a space exterior to the shell to the central cavity;
   an exterior shell at least partially circumscribing the interior shell;
   a clasp located between the interior shell and the exterior shell to prevent separation of the exterior shell from the interior shell; and
   a packing material located within the central cavity to seal the at least one cable within the interior shell.

2. The cable bushing assembly according to claim 1, wherein the inside diameter of the exterior shell and the outside diameter of the corresponding portion of the interior shell creates an annular space having a width dimension of less than about 0.08 mm.

3. The cable bushing assembly according to claim 2, wherein the cable bushing assembly is configured to provide an intrinsically safe connection between a space exterior to a housing and a space interior to the housing.

4. The cable bushing assembly according to claim 2, wherein the exterior shell is located concentrically to the interior shell, the annular space is configured to enable the exterior shell to rotate relative to the interior shell.

5. The cable bushing assembly according to claim 1, wherein a threaded connection is formed on a portion of the exterior shell to enable selective engagement with the housing.

6. The cable bushing assembly according to claim 1, wherein the at least one cable is a coaxial cable.

7. The cable bushing assembly according to claim 6, wherein the coaxial cable includes a coaxial connector located on at least one end of the at least one coaxial cable.

8. A cable bushing assembly including:
   an interior shell defining a central cavity and having a barrier wall between the central cavity and an exterior of the interior shell, with the barrier wall having at least one aperture between a first face and a second face, the at least one aperture configured to permit at least one cable to pass through the interior shell from a space exterior to the shell to the central cavity, the interior shell further including a plate within the central cavity, the plate including at least one aperture configured to permit at least one cable to pass through the plate;
   an exterior shell at least partially circumscribing the interior shell;
   a clasp located between the interior shell and the exterior shell to prevent separation of the exterior shell from the interior shell; and
   a packing material located within the central cavity to seal the at least one cable within the interior shell.

9. The cable bushing assembly according to claim 8, wherein the inside diameter of the exterior shell and the outside diameter of the corresponding portion of the interior shell creates an annular space having a width dimension of less than about 0.08 mm.

10. The cable bushing assembly according to claim 9, wherein the cable bushing assembly is configured to provide an intrinsically safe connection between a space exterior to a housing and a space interior to the housing.

11. The cable bushing assembly according to claim 9, wherein the exterior shell is located concentrically to the interior shell, the annular space is configured to enable the exterior shell to rotate relative to the interior shell.

12. The cable bushing assembly according to claim 8, wherein a threaded connection is formed on a portion of the exterior shell to enable selective engagement with the housing.

13. The cable bushing assembly according to claim 8, wherein the at least one cable is a coaxial cable.

14. The cable bushing assembly according to claim 13, wherein the coaxial cable includes a coaxial connector located on at least one end of the at least one coaxial cable.

15. A method of sealing a cable penetration through a housing including:

providing a housing with an opening extending through a wall of the housing;

inserting a cable bushing assembly into the opening, the cable bushing assembly including:

an interior shell defining a central cavity and having a barrier wall between the central cavity and an exterior of the interior shell, with the barrier wall having at least one aperture between a first face and a second face of the barrier wall, the at least one aperture configured to enable at least one cable to pass through the interior shell from a space exterior to the shell to the central cavity, an exterior shell at least partially circumscribing the interior shell, a clasp located between the interior shell and the exterior shell to prevent separation of the exterior shell from the interior shell, a packing material is located within the central cavity to seal the at least one cable within the interior shell; and securing the cable bushing assembly to the housing.

16. The method of sealing a cable penetration through a housing according to claim 15, wherein the inside diameter of the exterior shell and the outside diameter of the corresponding portion of the interior shell creates an annular space having a width dimension of less than about 0.08 mm.

17. The method of sealing a cable penetration through a housing according to claim 16, wherein the cable bushing assembly is configured to provide an intrinsically safe connection between a space exterior to a housing and a space interior to the housing.

18. The method of sealing a cable penetration through a housing according to claim 16, wherein the exterior shell is located concentrically to the interior shell, the annular space is configured to enable the exterior shell to rotate about a central axis relative to the interior shell.

19. The method of sealing a cable penetration through a housing according to claim 15, wherein a threaded connection is formed on a portion of the exterior shell to enable selective engagement with the housing.

20. The method of sealing a cable penetration through a housing according to claim 15, wherein the at least one cable is a coaxial cable and the coaxial cable includes a coaxial connector located on at least one end of the at least one coaxial cable.

* * * * *